(12) United States Patent
Shirakami

(10) Patent No.: US 12,122,191 B2
(45) Date of Patent: Oct. 22, 2024

(54) MOTORCYCLE TIRE

(71) Applicant: SUMITOMO RUBBER INDUSTRIES, LTD., Kobe (JP)

(72) Inventor: Kazuya Shirakami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 172 days.

(21) Appl. No.: 17/400,707

(22) Filed: Aug. 12, 2021

(65) Prior Publication Data

US 2022/0072911 A1 Mar. 10, 2022

(30) Foreign Application Priority Data

Sep. 10, 2020 (JP) ................................. 2020-151950

(51) Int. Cl.
*B60C 11/11* (2006.01)
*B60C 11/03* (2006.01)
*B60C 11/13* (2006.01)

(52) U.S. Cl.
CPC ........... *B60C 11/11* (2013.01); *B60C 11/0302* (2013.01); *B60C 11/0306* (2013.01); *B60C 11/033* (2013.01); *B60C 11/1376* (2013.01); *B60C 2200/10* (2013.01)

(58) Field of Classification Search
CPC . B60C 11/11; B60C 11/0302; B60C 11/1376; B60C 11/033; B60C 2200/10
USPC ...... D12/506, 512, 534, 536, 544, 569, 571, D12/579
See application file for complete search history.

(56) References Cited

U.S. PATENT DOCUMENTS

| D508,674 S | * | 8/2005 | Dumigan | .................... D12/544 |
| 2015/0165826 A1 | | 6/2015 | Oba | |
| 2018/0147892 A1 | | 5/2018 | Maeda | |

FOREIGN PATENT DOCUMENTS

| CN | 111086359 A | * | 5/2020 | ......... B60C 11/0306 |
| EP | 2204295 A1 | | 7/2010 | |
| EP | 2998129 A1 | | 3/2016 | |
| EP | 3747671 A1 | | 12/2020 | |
| JP | 2013212840 A | * | 10/2013 | .............. B60C 11/11 |
| JP | 2015134578 A | * | 7/2015 | .......... B60C 11/1376 |
| JP | 2018-83585 A | | 5/2018 | |
| JP | 2020111262 A | * | 7/2020 | ............. B60C 11/03 |
| WO | WO 2019/151505 A1 | | 8/2019 | |

OTHER PUBLICATIONS

Extended European Search Report for European Application No. 21193253.8, dated Feb. 8, 2022.

\* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

In a tire 2, each crown block 22c has a laterally extending shape that is longer in an axial direction and shorter in a rotation direction. A top surface 32c of the crown block 22c includes a crown front edge 46c. The crown front edge 46c has a bottom BC located on a heel side with respect to both ends thereof in the rotation direction. Of the crown front edge 46c, a portion connecting the bottom BC and each end forms an inclined edge 54c extending from the bottom BC to the end and inclined to a toe side in the rotation direction. The inclined edge 54c of the crown front edge 46c includes at least three edge components 58c.

14 Claims, 12 Drawing Sheets

MOTORCYCLE TIRE

TECHNICAL FIELD

The present invention relates to motorcycle tires. Specifically, the present invention relates to tires for a motorcycle that runs on rough terrain.

This application claims priority on Japanese Patent Application No. 2020-151950 filed on Sep. 10, 2020, the entire content of which is incorporated herein by reference.

BACKGROUND ART

A plurality of blocks are provided in the tread of a tire for a motorcycle that runs on rough terrain. In order to obtain great traction, adoption of crown blocks and middle blocks having a laterally extending shape is considered (for example, in PATENT LITERATURE 1 below).

In the tire disclosed in PATENT LITERATURE 1, as shown in FIG. 2 of PATENT LITERATURE 1, inclined edges are formed in front edges located on the toe side of the crown blocks and the middle blocks.

CITATION LIST

Patent Literature

PATENT LITERATURE 1: Japanese Laid-Open Patent Publication No. 2018-83585

SUMMARY OF INVENTION

Technical Problem

The above-described inclined edges extend in a straight manner from the inner side toward the outer side in the axial direction and are inclined to the toe side. When the tire runs on a soft road surface such as muddy ground or sandy ground, mud or sand is collected toward the center portion of each crown block. The crown block shears a large amount of mud or sand, and thus great traction is generated.

On a hard road surface such as a road surface composed of rocks and a road surface composed of packed sand, side slip may occur during running. When side slip occurs, the direction of the tire with respect to the traveling direction is changed, so that there is a concern that the above-described inclined edges cannot exhibit a sufficient edge effect. In this case, sufficient traction cannot be obtained, so that the amount of slip in the lateral direction is increased.

The present invention has been made in view of the above circumstances, and an object of the present invention is to provide a motorcycle tire that can achieve improvement of traction performance and side slip resistance on a hard road surface while maintaining traction performance on a soft road surface.

Solution to Problem

A motorcycle tire according to an aspect of the present invention includes a tread having a tread surface that forms an outer circumferential surface and having a designated rotation direction. The tread includes a plurality of blocks including a crown block located on an equator plane and a middle block located outward of the crown block in an axial direction. Each of the plurality of blocks includes a top surface that forms a part of the tread surface. The crown block and the middle block each have a laterally extending shape that is longer in the axial direction and shorter in the rotation direction. The top surface of the crown block includes a crown front edge located on a toe side in the rotation direction. The crown front edge has a bottom located on a heel side with respect to both ends thereof in the rotation direction. The crown front edge has a portion connecting the bottom and each of the ends, the portion forming an inclined edge extending from the bottom to the end and inclined to the toe side in the rotation direction. The top surface of the middle block includes a middle front edge located on the toe side in the rotation direction. An inner end of the middle front edge is located on the heel side with respect to an outer end thereof in the rotation direction. The middle front edge extends from the inner end toward the outer end and is inclined to the toe side in the rotation direction. The inclined edge of the crown front edge and the middle front edge each include at least three edge components.

Preferably, in the motorcycle tire, the at least three edge components include at least one combination of edge components having a difference in inclination angle therebetween whose absolute value is not greater than 10°.

Preferably, in the motorcycle tire, an inclination angle of each edge component included in the combination of the edge components is not less than 10° and not greater than 45°.

Preferably, in the motorcycle tire, the at least three edge components includes a steep inclination component having an inclination angle of greater than 45° and not greater than 90°.

Preferably, in the motorcycle tire, the top surface of each block includes a land surface. A land/sea ratio represented as a ratio of a total area of the land surfaces to a total area of a portion other than the land surfaces in the tread surface is not less than 13% and not greater than 60%.

Advantageous Effects of Invention

According to the present invention, a motorcycle tire that can achieve improvement of traction performance and side slip resistance on a hard road surface while maintaining traction performance on a soft road surface, is obtained.

DESCRIPTION OF EMBODIMENTS

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state. In the present disclosure, unless otherwise specified, the dimensions and angles of components of the tire are measured in the normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, of components included in the tire, the hardness of each component formed from a crosslinked rubber is measured according to JIS K6253 under a temperature condition of 23° C. using a type A durometer.

Figure 1:
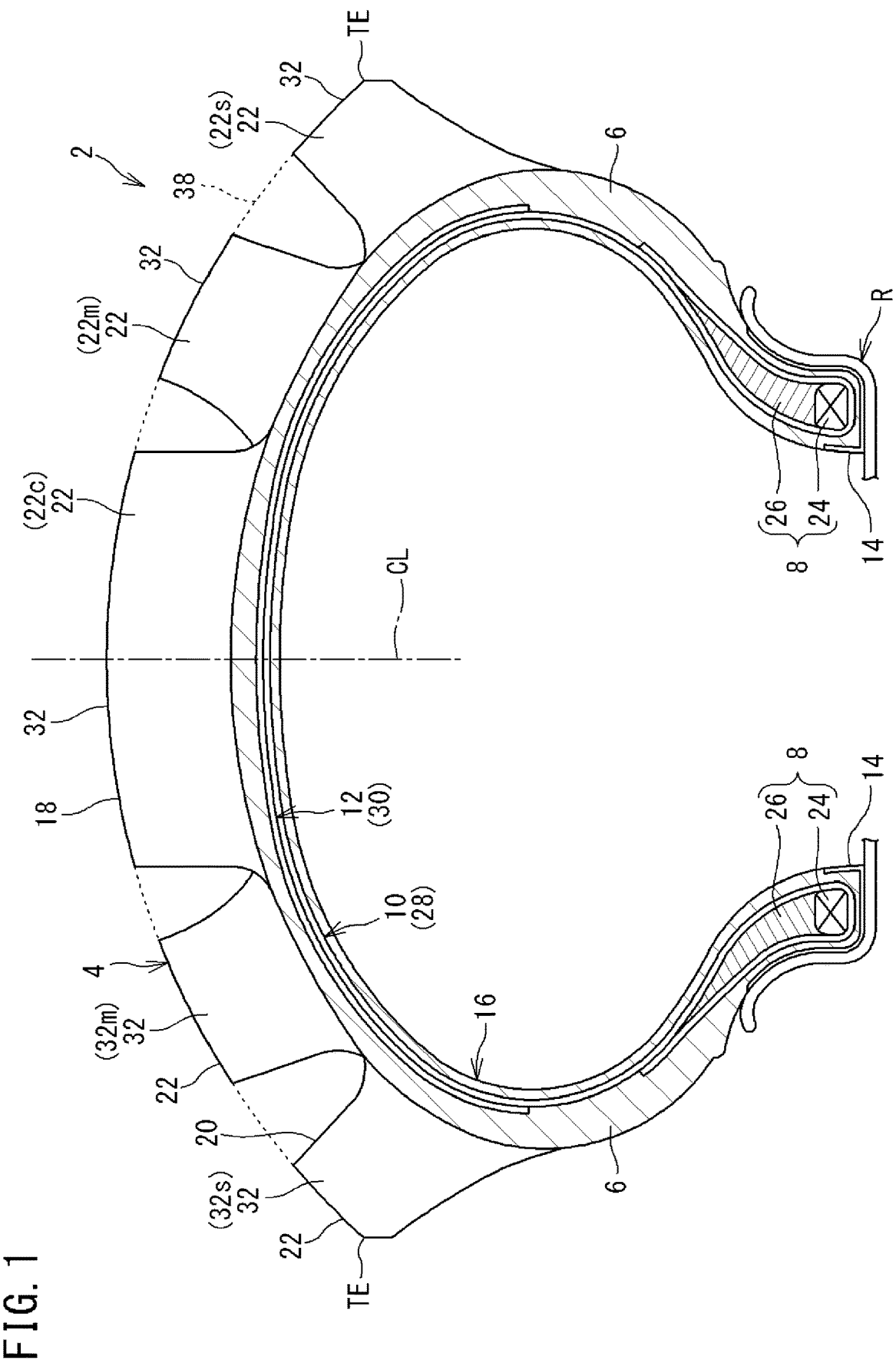
FIG. 1 is a cross-sectional view showing a part of a motorcycle tire according to an embodiment of the present invention.

FIG. 1 shows a part of a motorcycle tire 2 according to an embodiment of the present invention. In FIG. 1, the tire 2 is fitted on a rim R (normal rim) and is in a normal state. The tire 2 is mounted to a motorcycle that runs on rough terrain.

FIG. 1 shows a part of a cross-section of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. The tire 2 rotates in the circumferential direction about the rotation axis. The circumferential direction of the tire 2 is also the rotation direction of the tire 2. In FIG. 1, an alternate long and short dash line CL represents the equator plane of the tire 2.

The tire 2 includes a tread 4, a pair of sidewalls 6, a pair of beads 8, a carcass 10, a belt 12, a pair of chafers 14, and an inner liner 16.

The tread 4 is formed from a crosslinked rubber for which grip performance and traction performance are taken into consideration. The outer surface of the tread 4 is also referred to as a tread surface 18 and forms an outer circumferential surface of the tire 2. The tread 4 has the tread surface 18 which forms the outer circumferential surface of the tire 2. In FIG. 1, reference character TE represents an end of the tread surface 18.

The tread 4 includes a plurality of blocks 22 demarcated by a groove 20. These blocks 22 form a block pattern. Although described later, the block pattern of the tire 2 is a directional pattern having a designated rotation direction. The tire 2 includes the tread 4 having a designated rotation direction. The rotation direction of the tire 2 is indicated, for example, on each sidewall 6 by characters or symbols.

Although not described in detail, in the tire 2, the height of each block 22 is set as appropriate in the range of not less than 11 mm and not greater than 22 mm.

In the tire 2, the hardness of the tread 4 is preferably not less than 70. Accordingly, the stiffness of each block 22 is effectively ensured. The block 22 comes into contact with a road surface so as to stick to the road surface. Deformation of the block 22 when coming into contact with a road surface is also suppressed, so that the shearing force is increased and great traction is generated. From the viewpoint of maintaining good grip performance, the hardness of the tread 4 is preferably not greater than 85.

Each sidewall 6 is connected to an end of the tread 4. The sidewall 6 extends radially inward along the carcass 10. The sidewall 6 is formed from a crosslinked rubber for which cut resistance is taken into consideration.

Each bead 8 is located radially inward of the sidewall 6. The bead 8 includes a core 24 and an apex 26. The core 24 has a ring shape and includes a steel wire. The apex 26 is located radially outward of the core 24. The apex 26 is formed from a crosslinked rubber that has high stiffness. The apex 26 has a tapered shape.

The carcass 10 is located inward of the tread 4 and the pair of sidewalls 6. The carcass 10 extends on and between one bead 8 and the other bead 8. The carcass 10 includes at least one carcass ply 28. The carcass ply 28 includes a large number of carcass cords aligned with each other, which are not shown. These carcass cords are covered with a topping rubber formed from a crosslinked rubber.

The belt 12 is located between the tread 4 and the carcass 10 in the radial direction. The belt 12 is laminated on the carcass 10. The belt 12 includes at least one layer 30. The layer 30 included in the belt 12 includes a large number of belt cords aligned with each other, which are not shown. These belt cords are covered with a topping rubber formed from a crosslinked rubber.

Each chafer 14 is located radially inward of the bead 8. The chafer 14 comes into contact with the rim R. In the tire 2, the chafer 14 includes a fabric and a rubber with which the fabric is impregnated.

The inner liner 16 is located inward of the carcass 10. The inner liner 16 forms an inner surface of the tire 2. The inner liner 16 is formed from a crosslinked rubber that has a low gas permeability coefficient. The inner liner 16 maintains the internal pressure of the tire 2.

Figure 2:
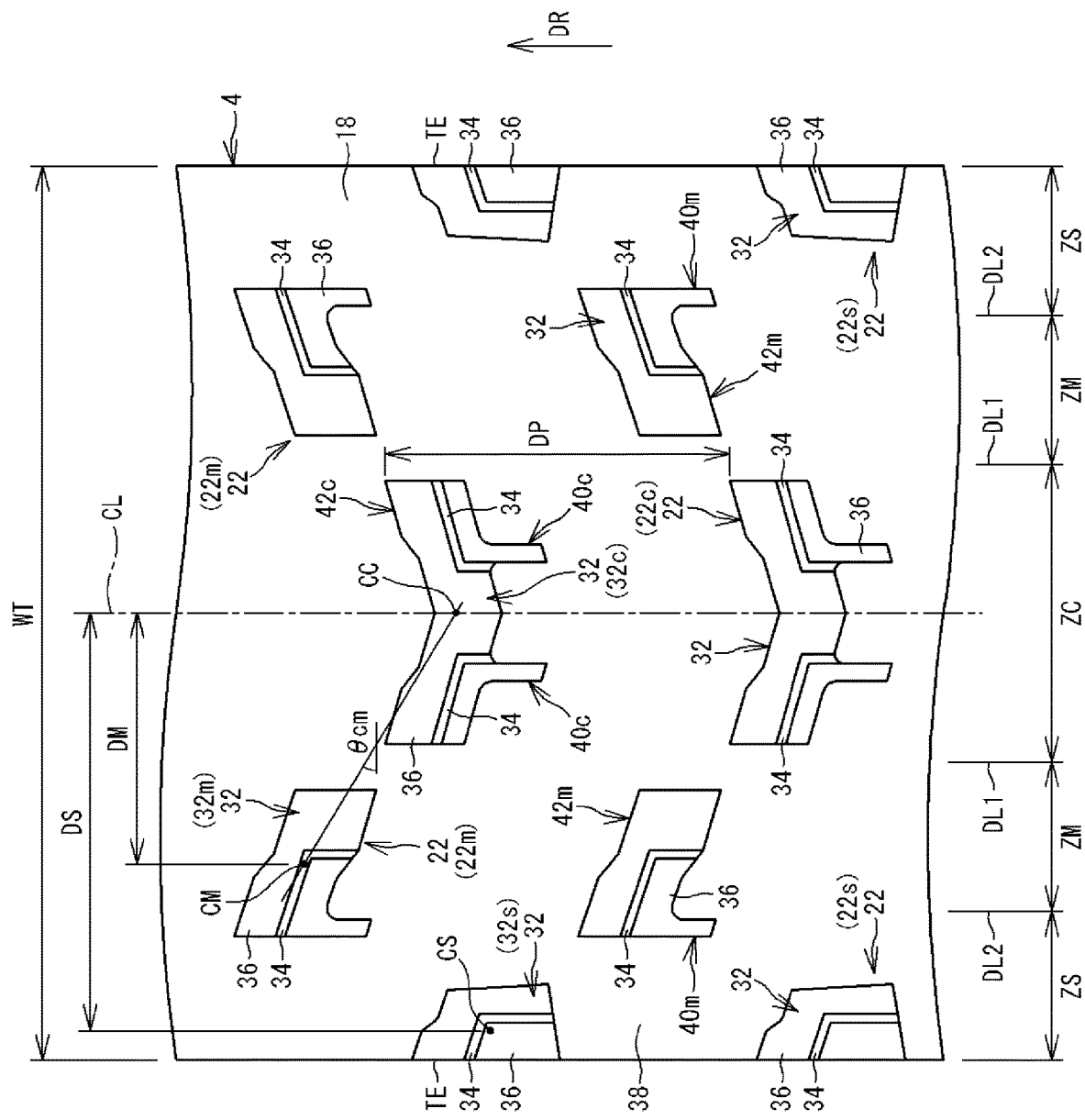
FIG. 2 is a development showing a part of a tread surface.

FIG. 2 shows the block pattern of the tire 2. In FIG. 2, the right-left direction is the axial direction of the tire 2, and the up-down direction is the circumferential direction of the tire 2. The direction perpendicular to the surface of the sheet of FIG. 2 is the radial direction of the tire 2.

In FIG. 2, a direction indicated by an arrow DR is the rotation direction of the tire 2. In the tire 2, the rotation direction is designated as the direction shown in FIG. 2. The tire 2 comes into contact with a road surface from the upper side to the lower side of the surface of the sheet of FIG. 2. The upper side of the surface of the sheet is a rotation direction toe side, and the lower side of the surface of the sheet is a rotation direction heel side.

In FIG. 2, a length indicated by a double-headed arrow WT is a development width of the tread surface 18. The development width WT is represented as the distance, in the axial direction from one end TE of the tread surface 18 to the other end TE of the tread surface 18, measured along the tread surface 18.

As described above, the plurality of blocks 22 is provided in the tread 4 of the tire 2. Each of top surfaces 32 of these blocks 22 forms a part of the tread surface 18. Although not described in detail, narrow grooves 34 are formed on the top surfaces 32 of the blocks 22. Accordingly, the top surface 32 of each block 22 is divided into a plurality of zones, for example, a toe-side zone located on the toe side with respect to the narrow groove 34 and a heel-side zone located on the heel side with respect to the narrow groove 34. Of these blocks 22. particularly, in each of the blocks 22 corresponding to later-described middle blocks and shoulder blocks, from the viewpoint of exhibiting an edge effect, the top surface 32 may be formed such that the heel-side zone is higher than the toe-side zone by 0.5 mm to 2.0 mm.

In the tire 2, in the top surface 32 of each block 22, a part other than the narrow groove 34 is an existing top surface and is referred to as a land surface 36. The top surface 32 includes the land surface 36. In the tire 2, the top surface 32 of each block 22 includes the narrow groove 34 and the land surface 36. In the tire 2, the narrow groove 34 does not have to be formed on the top surface 32 of the block 22. In this case, the top surface 32 of the block 22 is composed of only the land surface 36.

In the tire 2, of the tread surface 18, a portion corresponding to the groove 20 and the narrow grooves 34, that is, a portion other than the land surfaces 36, is referred to as a sea surface 38. The tread surface 18 includes a plurality of the land surfaces 36 and the sea surface 38.

In the tire 2, the ratio of the sum of the areas of the land surfaces 36, that is, the total area of the land surfaces 36, to the total area of the sea surface 38 is referred to as a land/sea ratio. The land/sea ratio is calculated, for example, on the basis of the development of the tread surface 18 shown in FIG. 2.

In the tread surface 18 of the tire 2, the land/sea ratio is not less than 13% and not greater than 60%. Accordingly, the blocks 22 that are less likely to be deformed when coming into contact with the ground, and that, in particular, effectively stick to a soft road surface such as muddy ground or sandy ground when coming into contact with the soft road surface, are formed. In the tire 2, improvement of traction performance is achieved.

In FIG. 2, two solid lines DL1 located on both sides of the equator plane CL are division lines that divide the development width WT of the tread surface 18 into three equal parts. In the tire 2, a region from one division line DL1 to the other division line DL1 is also referred to as a crown region ZC. In the tire 2, the center in the axial direction of the crown region ZC is located on the equator plane CL.

In FIG. 2, left and right solid lines DL2 are each a division line that divides a region from the division line DL1 to the end TE of the tread surface 18 into two equal parts. In the tire 2, a region from each end TE of the tread surface 18 to the division line DL2 is also referred to as a side region ZS. The side region ZS includes the end TE of the tread surface 18. A region from each division line DL2 to the division line DL1 is also referred to as a middle region ZM. The middle region ZM is located inward of the side region ZS and outward of the crown region ZC in the axial direction. The tread 4 is divided into the crown region ZC, a pair of the middle regions ZM, and a pair of the side regions ZS.

In the center region ZC, a plurality of crown blocks 22c are provided. These crown blocks 22c are located on the equator plane CL. In the tire 2, the plurality of blocks 22 provided in the tread 4 include the plurality of crown blocks 22c located on the equator plane CL.

The plurality of crown blocks 22c are arranged at intervals in the rotation direction. These crown blocks 22c are arranged in the rotation direction in a row. In the tire 2, the entirety of each crown block 22c is located in the crown region ZC, and the equator plane CL intersects the crown block 22c.

In FIG. 2, a double-headed arrow DP represents the pitch of arrangement of the crown blocks 22c. In the tire 2, the ratio (DP/WT) of the pitch of arrangement DP of the crown blocks 22c to the development width WT of the tread surface 18 is preferably not less than 0.30 and not greater than 0.50.

In FIG. 2, reference character CC represents the centroid of a top surface 32c of the crown block 22c. The centroid CC of the top surface 32c is located on the equator plane CL. The top surface 32c of the crown block 22c has a shape that is symmetrical about the equator plane CL. The top surface 32c may be formed in a shape that is asymmetrical about the equator plane CL.

As shown in FIG. 2, each crown block 22c is provided with a pair of projections 40c which are arranged with the equator plane CL therebetween and extend in the circumferential direction. The crown block 22c includes a block main body 42c and the pair of projections 40c extending from the block main body 42c to the heel side. In the tire 2, the crown block 22c may be composed of only the block main body 42c.

During running of the tire 2, the projections 40c support the block main body 42c from the heel side and suppress excessive falling-down of the block main body 42c to the heel side. Since the projections 40c extend in the circumferential direction, the projections 40c serve as edges during cornering of the tire 2. The projections 40c contribute to improvement of cornering stability.

In each middle region ZM, a plurality of middle blocks 22m are provided. These middle blocks 22m are located outward of the crown blocks 22c in the axial direction. In the tire 2, the plurality of blocks 22 provided in the tread 4 include the plurality of middle blocks 22m located outward of the crown blocks 22c in the axial direction.

The plurality of middle blocks 22m are arranged at intervals in the rotation direction. These middle blocks 22m are arranged in the rotation direction in a row. In the rotation direction, a middle block 22m is located between one crown block 22c and another crown block 22c. In the tire 2, the pitch of arrangement of the middle blocks 22m is equal to the pitch of arrangement DP of the crown blocks 22c.

In the tire 2, a part of each middle block 22m is located in the side region ZS. In other words, each of the above-described division lines DL2 intersects the middle blocks 22m. The middle blocks 22m may each be disposed such that the entirety thereof is located in the middle region ZM.

In FIG. 2, reference character CM represents the centroid of a top surface 32m of the middle block 22m. In the tire 2, the centroid CM of the top surface 32m is located outward of the center in the axial direction of the middle region ZM. In the tire 2, the ratio (DM/WT) of a distance DM, in the axial direction from the centroid CM to the equator plane CL, measured along the tread surface 18 to the development width WT of the tread surface 18 is not less than 0.25 and not greater than 0.35.

In FIG. 2, an angle θ cm represents the angle of a line segment connecting the centroid CM of the top surface 32m of the middle block 22m and the centroid CC of the top surface 32c of the crown block 22c relative to the axial direction. In the tire 2, from the viewpoint that the crown block 22c and the middle block 22m can contribute to great traction in various road surface conditions, the angle θ cm is preferably not less than 20° and preferably not greater than 45°.

As shown in FIG. 2, each middle block 22m is provided with a projection 40m extending in the circumferential direction. In the tire 2, each middle block 22m includes a block main body 42m and the projection 40m extending from the block main body 42m to the heel side. In the tire 2, each middle block 22m may be composed of only the block main body 42m.

The projection 40m is located at an outer portion of the middle block 22m in the axial direction. The projection 40m increases the stiffness of the outer portion of the middle block 22m and promotes deformation of an inner portion of the middle block 22m.

In each side region ZS, a plurality of side blocks 22s are provided. These side blocks 22s are located outward of the middle blocks 22m in the axial direction. In the tire 2, the plurality of blocks 22 provided in the tread 4 include the plurality of side blocks 22s located outward of the middle blocks 22m in the axial direction.

The plurality of side blocks 22s are arranged at intervals in the rotation direction. These side blocks 22s are arranged in the rotation direction in a row. In the rotation direction, a side block 22s is located between one middle block 22m and another middle block 22m. In the tire 2, the pitch of arrangement of the side blocks 22s is equal to the pitch of arrangement of the middle blocks 22m. Each side block 22s is located on the heel side with respect to the crown block 22c located between one middle block 22m and another middle block 22m in the rotation direction.

In the tire 2, of the plurality of blocks 22 provided in the tread 4, the side blocks 22s are blocks 22 located on the outermost side in the axial direction. The entirety of each side block 22s is located in the side region ZS.

In FIG. 2, reference character CS represents the centroid of a top surface 32s of the side block 22s. In the tire 2, the centroid CS of the top surface 32s is located outward of the center in the axial direction of the side region ZS. In the tire 2, the ratio (DS/WT) of a distance DS, in the axial direction from the centroid CS to the equator plane CL, measured along the tread surface 18 to the development width WT of the tread surface 18 is not less than 0.40 and not greater than 0.48. In the tire 2, the side edge of each top surface 32s that is located on the outer side in the axial direction corresponds to the end TE of the tread surface 18.

Figure 3:
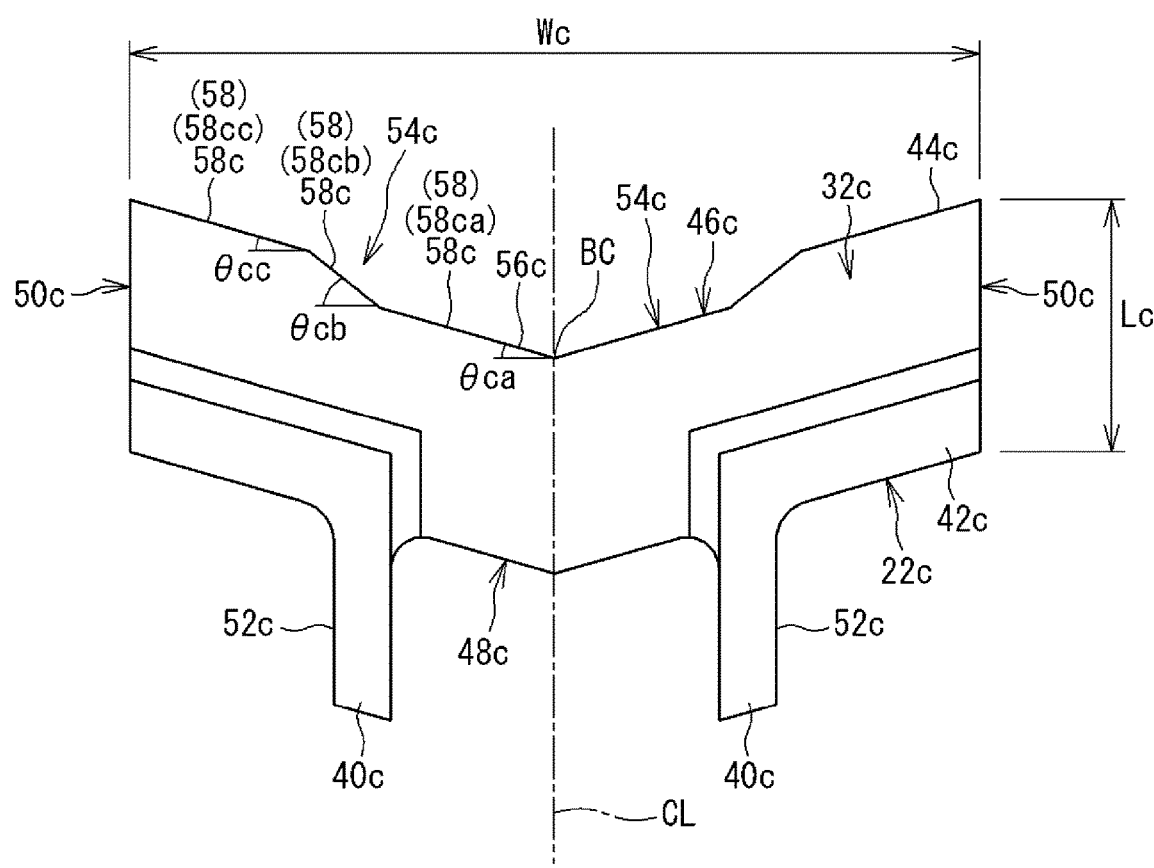
FIG. 3 is a development showing a crown block.

FIG. 3 shows a part of the tread surface 18 shown in FIG. 2. FIG. 3 shows the top surface 32c of a crown block 22c. In FIG. 3, the right-left direction is the axial direction of the tire 2, and the up-down direction is the circumferential direction of the tire 2. The direction perpendicular to the surface of the sheet of FIG. 3 is the radial direction of the tire 2.

An edge 44c of the top surface 32c of the crown block 22c includes a front edge 46c (hereinafter, a crown front edge 46c) located on the toe side in the rotation direction, a rear edge 48c (hereinafter, a crown rear edge 48c) located on the heel side in the rotation direction, and a pair of side edges 50c (hereinafter, crown side edges 50c) extending between the crown front edge 46c and the crown rear edge 48c. The top surface 32c of the crown block 22c includes the crown front edge 46c, the crown rear edge 48c, and the pair of crown side edges 50c.

As described above, the crown block 22c is provided with the projections 40c extending from the block main body 42c to the heel side. In the crown rear edge 48c, edges 52c of the projections 40c are reflected. The crown side edges 50c have a straight shape and extend in the circumferential direction. In the crown block 22c, the projections 40c are located inward of the crown side edges 50c in the axial direction. Therefore, in the crown side edges 50c, the edges 52c of the projections 40c are not reflected.

In FIG. 3, a double-headed arrow Wc represents the length of the crown front edge 46c. The length Wc is represented as the distance, in the axial direction from one end of the crown front edge 46c to the other end of the crown front edge 46c, measured along the tread surface 18. In the tire 2, the length in the axial direction of the top surface 32c of each crown block 22c is represented as the length Wc of the crown front edge 46c. In FIG. 3, a double-headed arrow Lc represents the length of the crown side edge 50c. The length Lc is represented as the distance, in the circumferential direction from the end on the toe side (hereinafter, front end) of the crown side edge 50c to the end on the heel side (hereinafter, rear end) of the crown side edge 50c, measured along the tread surface 18. In the tire 2, the length in the circumferential direction of the top surface 32c of each crown block 22c is represented as the length Lc of the crown side edge 50c.

In the tire 2, the length Wc in the axial direction of the top surface 32c of each crown block 22c is longer than the length Lc in the circumferential direction thereof. The crown block 22c has a laterally extending shape that is longer in the axial direction and shorter in the circumferential direction. The crown block 22c can shear a lot of mud or sand on a soft road surface, and thus can contribute to generation of great traction. From this viewpoint, the ratio (Lc/Wc) of the length Lc in the circumferential direction of the top surface 32c to the length Wc in the axial direction thereof is preferably not less than 0.15 and not greater than 0.40. From the same viewpoint, the ratio (Wc/WT) of the length Wc in the axial direction to the development width WT of the tread surface 18 is preferably not less than 0.25 and not greater than 0.35.

The crown front edge 46c has a shape recessed to the heel side in the rotation direction. In FIG. 3, reference character BC represents the position, in the crown front edge 46c, farthest on the heel side from the end thereof. The position BC corresponds to the bottom of the crown front edge 46c. The crown front edge 46c has the bottom BC located on the heel side with respect to both ends thereof in the rotation direction. Of the crown front edge 46c, a portion connecting the bottom BC and each end forms an inclined edge 54c extending from the bottom BC toward the end and inclined to the toe side in the rotation direction. The crown front edge 46c includes a pair of inclined edges 54c extending from the bottom BC toward the ends and inclined to the toe side in the rotation direction. In the tire 2, the start end of each inclined edge 54c coincides with the bottom BC, but, for example, the start ends of the left and right inclined edges 54c may be connected by an edge (not shown) which includes the bottom BC, extends in the axial direction, and has a straight shape or an arc shape.

In the tire 2, the bottom BC of each crown front edge 46c is located on the equator plane CL. The bottom BC may be provided at a position away from the equator plane CL in the axial direction.

A wall surface 56c of the crown block 22c is present between the top surface 32c of the crown block 22c and the bottom of the groove 20. Since the crown front edge 46c has a recessed shape, the shape of the crown front edge 46c is reflected in the wall surface 56c connecting the crown front edge 46c and the bottom of the groove 20.

In the tire 2, the wall surface 56c on the toe side of each crown block 22c is recessed to the heel side. Therefore, when the tire 2 runs on a soft road surface, mud or sand moves from the outer side of the crown block 22c toward the center of the crown block 22c. The mud or sand is effectively collected at the center portion of the crown block 22c, so that the crown block 22c can shear a lot of the mud or sand. In the tire 2, greater traction is generated.

In the tire 2, each inclined edge 54c of each crown front edge 46c includes at least three edge components 58c. The number of the edge components 58c included in the inclined edge 54c of the crown front edge 46c shown in FIG. 3 is three. These three edge components 58c are a first edge component 58ca, a second edge component 58cb, and a third edge component 58cc from the equator plane side toward the outer side in the axial direction. In each edge component 58c, the end located on the inner side in the axial direction is a start end, and the end located on the outer side in the axial direction is a terminal end. In the tire 2, the start end of the first edge component 58ca corresponds to the bottom BC of the crown front edge 46c, the start end of the second edge component 58cb corresponds to the terminal end of the first edge component 58ca, and the start end of the third edge component 58cc corresponds to the terminal end of the second edge component 58cb.

In FIG. 3, an angle θca is the angle (inclination angle) of the first edge component 58ca relative to the axial direction. The inclination angle θca of the first edge component 58ca is measured at the start end of the first edge component 58ca. An angle θcb is the inclination angle of the second edge component 58cb. The inclination angle θcb of the second edge component 58cb is measured at the start end of the second edge component 58cb. An angle θcc is the inclination angle of the third edge component 58cc. The inclination angle θcc of the third edge component 58cc is measured at the start end of the third edge component 58cc.

Each edge component 58c shown in FIG. 3 is composed of an edge component inclined to the toe side. The inclination angles θc of these edge components 58c are each represented as the minimum angle obtained by performing measurement clockwise from a reference line that passes through the start end and extends in the axial direction. In the tire 2, the edge components 58c included in each inclined edge 54c of each crown front edge 46c may include an edge component inclined to the heel side. In this case, the inclination angle of this edge component is represented as the minimum angle obtained by performing measurement clockwise from a reference line that passes through the terminal end and extends in the axial direction. It should be noted that the inclination angle θc of each edge component 58c located on the right side of the equator plane CL in the surface of the sheet of FIG. 3 is measured counterclockwise. The same applies to other drawings.

In the tire 2, the shape of each inclined edge 54c is a zigzag shape. In other words, as for the adjacent edge components 58c, the inclination angle θc of one edge component 58c and the inclination angle θc of the other edge component 58c are different from each other. In the tire 2, if the inclination angle θca of the first edge component 58ca and the inclination angle θcb of the second edge component 58cb are different from each other, and the inclination angle θcb of the second edge component 58cb and the inclination angle θcc of the third edge component 58cc are different from each other, the inclination angle θca of the first edge component 58ca and the inclination angle θcc of the third edge component 58cc may be equal to each other, or may be different from each other.

Figure 4:
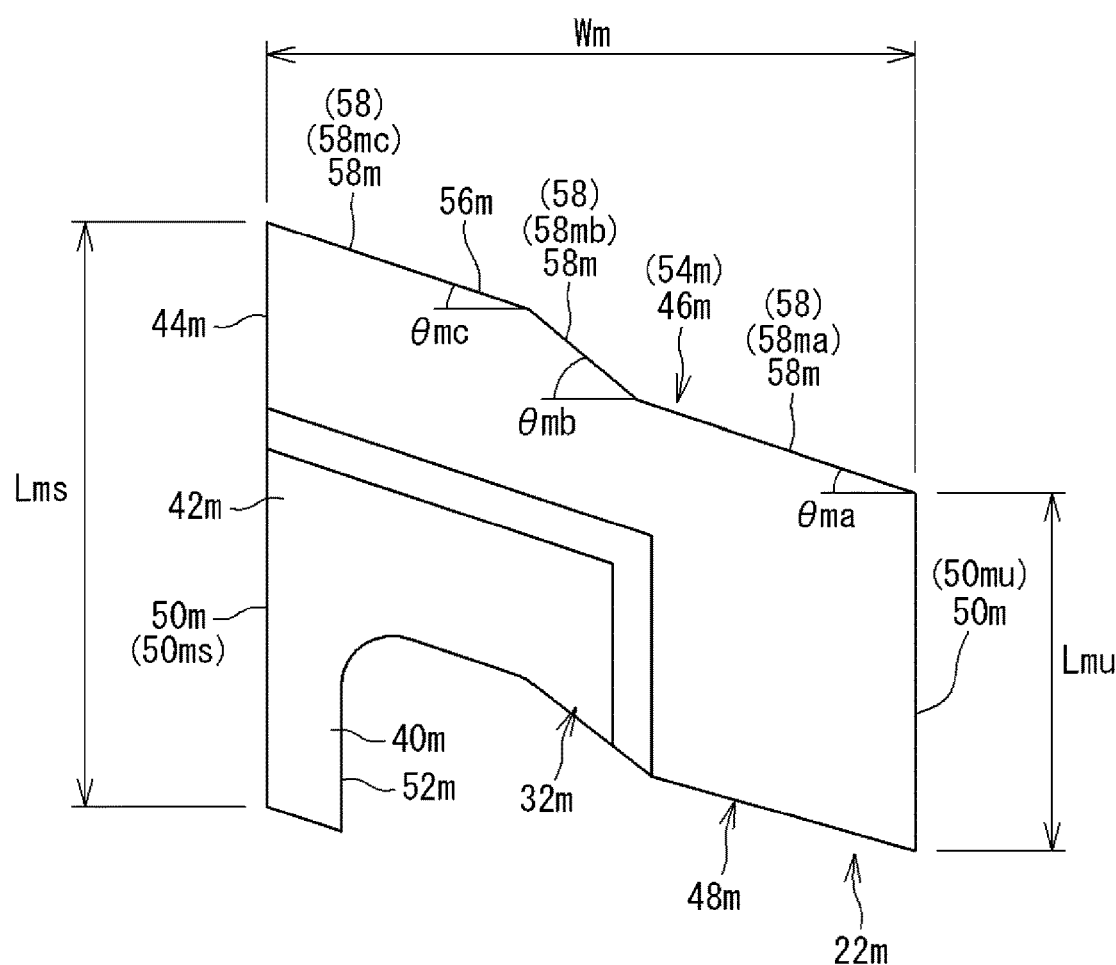
FIG. 4 is a development showing a middle block.

FIG. 4 shows a part of the tread surface 18 shown in FIG. 2. FIG. 4 shows the top surface 32m of a middle block 22m. In FIG. 4, the right-left direction is the axial direction of the tire 2, and the up-down direction is the circumferential direction of the tire 2. The direction perpendicular to the surface of the sheet of FIG. 4 is the radial direction of the tire 2.

An edge 44m of the top surface 32m of the middle block 22m includes a front edge 46m (hereinafter, middle front edge 46m) located on the toe side in the rotation direction, a rear edge 48m (hereinafter, middle rear edge 48m) located on the heel side in the rotation direction, and a pair of side edges 50m (hereinafter, middle side edges 50m) extending between the middle front edge 46m and the middle rear edge 48m. The top surface 32m of the middle block 22m includes the middle front edge 46m, the middle rear edge 48m, and the pair of middle side edges 50m. Of the pair of middle side edges 50m, the middle side edge 50m located on the inner side in the axial direction is an inner middle side edge 50mu, and the middle side edge 50m located on the outer side in the axial direction is an outer middle side edge 50ms.

As described above, each middle block 22m is provided with the projection 40m extending from the block main body 42m to the heel side. Therefore, in the middle rear edge 48m, an edge 52m of the projection 40m is reflected. The inner middle side edge 50mu and the outer middle side edge 50 ms have a straight shape and extend in the circumferential direction. As described above, the projection 40m of the middle block 22m is located at the outer portion of the middle block 22m in the axial direction. Thus, the edge 52m of the projection 40m is reflected in the outer middle side edge 50 ms, and the outer middle side edge 50ms is longer than the inner middle side edge 50mu.

In FIG. 4, a double-headed arrow Wm represents the length of the middle front edge 46m. The length Wm is represented as the distance, in the axial direction from the end on the inner side (hereinafter, inner end) of the middle front edge 46m to the end on the outer side (hereinafter, outer end) of the middle front edge 46m, measured along the tread surface 18. In the tire 2, the length in the axial direction of the top surface 32m of each middle block 22m is represented as the length Wm of the middle front edge 46m. In FIG. 4, a double-headed arrow Lmu represents the length of the inner middle side edge 50mu. The length Lmu is represented as the distance, in the circumferential direction from the front end of the inner middle side edge 50mu to the rear end of the inner middle side edge 50mu, measured along the tread surface 18. In the tire 2, the length in the circumferential direction of the top surface 32m of each middle block 22m is represented as the length Lmu of the inner middle side edge 50mu.

In the tire 2, the length Wm in the axial direction of the top surface 32m of each middle block 22m is longer than the length Lmu in the circumferential direction thereof. The middle block 22m has a laterally extending shape that is longer in the axial direction and shorter in the circumferential direction. The middle block 22m can shear a lot of mud or sand on a soft road surface, and thus can contribute to generation of great traction. From this viewpoint, the ratio (Lmu/Wm) of the length Lmu in the circumferential direction of the top surface 32m to the length Wm in the axial direction thereof is preferably not less than 0.35 and not greater than 0.75. From the same viewpoint, the ratio (Wm/WT) of the length Wm in the axial direction to the development width WT of the tread surface 18 is preferably not less than 0.10 and not greater than 0.20.

In the tire 2, the inner end of each middle front edge 46m is located on the heel side with respect to the outer end thereof in the rotation direction. The middle front edge 46m extends from the inner end toward the outer end and is inclined to the toe side in the rotation direction. In the tire 2, the middle front edge 46m itself forms an inclined edge 54m.

A wall surface 56m of the middle block 22m is present between the top surface 32m of the middle block 22m and the bottom of the groove 20. Since the middle front edge 46m is inclined, the wall surface 56m connecting the middle front edge 46m and the bottom of the groove 20 is also inclined in the same direction as this middle front edge 46m. Thus, when the tire 2 runs on a soft road surface, the middle block 22m guides mud or sand toward the crown block 22c. Since the crown block 22c can shear more mud or sand, greater traction is generated in the tire 2.

In the tire 2, each middle front edge 46m includes at least three edge components 58m. The number of the edge components 58m included in the middle front edge 46m shown in FIG. 4 is three. These three edge components 58m are a first edge component 58ma, a second edge component 58mb, and a third edge component 58mc from the equator plane side toward the outer side in the axial direction. In each edge component 58m, the end located on the inner side in the axial direction is a start end, and the end located on the outer side in the axial direction is a terminal end. In the tire 2, the start end of the first edge component 58ma corresponds to the inner end of the middle front edge 46m, the start end of the second edge component 58mb corresponds to the terminal end of the first edge component 58ma, and the start end of the third edge component 58mc corresponds to the terminal end of the second edge component 58mb.

In FIG. 4, an angle θma is the inclination angle of the first edge component 58ma. An angle θmb is the inclination angle of the second edge component 58mb. An angle θmc is the inclination angle of the third edge component 58mc. The inclination angle θm of each edge component 58m is measured in the same manner as the above-described inclination angles θc of the edge components 58c included in each crown front edge 46c.

In the tire 2, the shape of each middle front edge 46m is a zigzag shape. In the middle front edge 46m as well, similar to the above-described crown front edge 46c, as for the adjacent edge components 58m, the inclination angle θm of one edge component 58m and the inclination angle θm of the other edge component 58m are different from each other. In the tire 2, if the inclination angle θma of the first edge component 58ma and the inclination angle θmb of the second edge component 58mb are different from each other, and the inclination angle θmb of the second edge component 58mb and the inclination angle θmc of the third edge component 58mc are different from each other, the inclination angle θma of the first edge component 58ma and the inclination angle θmc of the third edge component 58mc may be equal to each other, or may be different from each other.

In FIG. 4, a double-headed arrow Lms represents the length in the circumferential direction of the outer middle side edge 50ms of the middle block 22m. The length Lms in the circumferential direction is represented as the distance, in the circumferential direction from the front end of the outer middle side edge 50ms to the rear end of the outer middle side edge 50ms, measured along the tread surface 18.

As described above, in the tire 2, the length Lms in the circumferential direction of the outer middle side edge 50ms is longer than the length Lmu in the circumferential direction of the inner middle side edge 50mu. The longer outer middle side edge 50ms increases the stiffness of the outer portion of the middle block 22m, and the shorter inner middle side edge 50mu promotes deformation of the inner portion of the middle block 22m. In the middle block 22m, the inner portion in the axial direction is more easily deformed than the outer portion in the axial direction. The middle block 22m effectively contributes to guiding mud or sand to the center portion of the crown block 22c. From this viewpoint, the ratio (Lms/Lmu) of the length Lms in the circumferential direction of the outer middle side edge 50ms to the length Lmu in the circumferential direction of the inner middle side edge 50mu (in other words, the length Lmu in the circumferential direction of the middle block 22m) is preferably not less than 1.45 and not greater than 2.15.

In the tire 2, each of the crown blocks 22c and the middle blocks 22m has a laterally extending shape that is longer in the axial direction and shorter in the rotation direction. Furthermore, each crown front edge 46c has the bottom BC located on the heel side with respect to both ends thereof in the rotation direction, and, of the crown front edge 46c, the portion connecting the bottom BC and each end forms the inclined edge 54c extending from the bottom BC toward the end and inclined to the toe side in the rotation direction. The inner end of each middle front edge 46m is located on the heel side with respect to the outer end thereof in the rotation direction, and the middle front edge 46m extends from the inner end toward the outer end and is inclined to the toe side in the rotation direction.

When the tire 2 runs on a soft road surface, mud or sand is effectively collected at the center portion of each crown block 22c. In the tire 2, since the crown block 22c can shear a lot of mud or sand, greater traction is generated. The tire 2 exhibits good traction performance on a soft road surface.

Meanwhile, the tire 2 runs not only on a soft road surface but also on a hard road surface such as a road surface composed of rocks and a road surface composed of packed sand. On a hard road surface, side slip easily occurs in the tire 2. When side slip occurs, the direction of the tire 2 relative to the travelling direction is changed, so that there is a concern that the inclined edges 54c of the crown front edges 46c and the middle front edges 46m cannot exhibit a sufficient edge effect, depending on the shapes of the inclined edges 54c of the crown front edges 46c and the middle front edges 46m. In this case, sufficient traction cannot be obtained, so that the amount of slip in the lateral direction is increased.

However, in the tire 2, each of the inclined edges 54c of the crown front edges 46c and the middle front edges 46m includes at least three edge components 58. Since each of the inclined edges 54c of the crown front edges 46c and the middle front edges 46m includes edge components 58 having different inclination angles θ, even when side slip occurs in the tire 2 during running on a hard road surface and the direction of the tire 2 relative to the travelling direction is changed, the inclined edges 54c of the crown front edges 46c and the middle front edges 46m can exhibit a sufficient edge effect. In the tire 2, sufficient traction is obtained even on a hard road surface, and the amount of slip in the lateral direction is effectively reduced. Furthermore, even when the direction of the tire 2 relative to the travelling direction is changed during running on a soft road surface, the wall surfaces 56c including the inclined edges 54c of the crown front edges 46c and the wall surfaces 56m including the middle front edges 46m receive mud or sand, so that a decrease in traction is prevented.

In the tire 2, improvement of traction performance and side slip resistance on a hard road surface is achieved while traction performance on a soft road surface is maintained.

In the tire 2, the lengths of the edge components 58 included in the inclined edges 54*c* of the crown front edges 46*c* and the middle front edges 46*m* are not particularly limited. From the viewpoint that the fact that each of the inclined edges 54*c* of the crown front edges 46*c* and the middle front edges 46*m* includes at least three edge components 58 can effectively contribute to achieving improvement of traction performance and side slip resistance on a hard road surface while maintaining traction performance on a soft road surface, the length of each edge component 58 is preferably not less than 2 mm. The upper limit of the length of the edge component 58 is determined as appropriate in accordance with the number of the edge components 58 included in each of the inclined edges 54*c* of the crown front edges 46*c* and the middle front edges 46*m*.

As described above, in the tire 2, each of the inclined edges 54*c* of the crown front edges 46*c* and the middle front edges 46*m* includes at least three edge components 58. From the viewpoint that the inclined edges 54*c* of the crown front edges 46*c* can contribute to improving traction performance and side slip resistance on a hard road surface while maintaining traction performance on a soft road surface, the number of the edge components 58*c* included in each of the inclined edges 54*c* of the crown front edges 46*c* is preferably not greater than 10, more preferably not greater than 7, and further preferably not greater than 5. From the viewpoint that the middle front edges 46*m* can contribute to improving traction performance and side slip resistance on a hard road surface while maintaining traction performance on a soft road surface, the number of the edge components 58*m* included in each middle front edge 46*m* is preferably not greater than 10, more preferably not greater than 7, and further preferably not greater than 5.

In the tire 2, the number of the edge components 58*c* included in each inclined edge 54*c* of each crown front edge 46*c* is equal to the number of the edge components 58*m* included in each middle front edge 46*m*. The number of the edge components 58*c* included in each inclined edge 54*c* of each crown front edge 46*c* may be larger or smaller than the number of the edge components 58*m* included in each middle front edge 46*m* From the viewpoint of being able to effectively collect mud or sand at the center portion of each crown block 22*c*, in the tire 2, the number of the edge components 58*c* included in each inclined edge 54*c* of each crown front edge 46*c* is preferably equal to the number of the edge components 58*m* included in each middle front edge 46*m*.

As described above, in each crown block 22*c* of the tire 2, each inclined edge 54*c* of the crown front edge 46*c* includes the first edge component 58*ca*, the second edge component 58*cb*, and the third edge component 58*cc*. In the tire 2, as for these three edge components 58*c*, a combination of the first edge component 58*ca* and the second edge component 58*cb* may be a combination of edge components 58*c* having a difference in inclination angle therebetween whose absolute value is not greater than 10°. A combination of the second edge component 58*cb* and the third edge component 58*cc* may be a combination of edge components 58*c* having a difference in inclination angle therebetween whose absolute value is not greater than 10°. A combination of the third edge component 58*cc* and the first edge component 58*ca* may be a combination of edge components 58*c* having a difference in inclination angle therebetween whose absolute value is not greater than 10°. If the at least three edge components 58*c* included in each inclined edge 54*c* of the crown front edge 46*c* includes at least one combination of edge components 58*c* having a difference in inclination angle therebetween whose absolute value is not greater than 10°, even when side slip occurs in the tire 2 during running on a hard road surface and the direction of the tire 2 relative to the travelling direction is changed, the inclined edge 54*c* of the crown front edge 46*c* can exhibit an edge effect required for generating traction. In the tire 2, sufficient traction is obtained even on a hard road surface, and the amount of slip in the lateral direction is effectively reduced. From this viewpoint, in the tire 2, the at least three edge components 58*c* included in each inclined edge 54*c* of the crown front edge 46*c* preferably includes at least one combination of edge components 58*c* having a difference in inclination angle therebetween whose absolute value is not greater than 10°.

As described above, in each middle block 22*m* of the tire 2, the middle front edge 46*m* includes the first edge component 58*ma*, the second edge component 58*mb*, and the third edge component 58*mc*. In the tire 2, as for these three edge components 58*m*, a combination of the first edge component 58*ma* and the second edge component 58*mb* may be a combination of edge components 58*m* having a difference in inclination angle therebetween whose absolute value is not greater than 10°. A combination of the second edge component 58*mb* and the third edge component 58*mc* may be a combination of edge components 58*m* having a difference in inclination angle therebetween whose absolute value is not greater than 10°. A combination of the third edge component 58*mc* and the first edge component 58*ma* may be a combination of edge components 58*m* having a difference in inclination angle therebetween whose absolute value is not greater than 10°. If the at least three edge components 58*m* included in the middle front edge 46*m* include at least one combination of edge components 58*m* having a difference in inclination angle therebetween whose absolute value is not greater than 10°, even when side slip occurs in the tire 2 during running on a hard road surface and the direction of the tire 2 relative to the travelling direction is changed, the middle front edge 46*m* can exhibit an edge effect required for generating traction. In the tire 2, sufficient traction is obtained even on a hard road surface, and the amount of slip in the lateral direction is effectively reduced. From this viewpoint, in the tire 2, the at least three edge components 58*m* included in the middle front edge 46*m* preferably include at least one combination of edge components 58*m* having a difference in inclination angle therebetween whose absolute value is not greater than 10°.

In the tire 2, from the viewpoint that sufficient traction is obtained even on a hard road surface and the amount of slip in the lateral direction is effectively reduced, more preferably, the at least three edge components 58*c* included in each inclined edge 54*c* of each crown front edge 46*c* includes at least one combination of edge components 58*c* having a difference in inclination angle therebetween whose absolute value is not greater than 10°, and the at least three edge components 58*m* included in each middle front edge 46*m* includes at least one combination of edge components 58*m* having a difference in inclination angle therebetween whose absolute value is not greater than 10°.

In the tire 2, in each inclined edge 54*c* of each crown front edge 46*c*, the inclination angle of each edge component 58*c* included in the combination of edge components 58*c* having a difference in inclination angle therebetween whose absolute value is not greater than 10° is preferably not less than 10° and preferably not greater than 45°.

If the inclination angle of each edge component 58*c* included in the combination of edge components 58*c* having a difference in inclination angle therebetween whose absolute value is not greater than 10° is set to be not less than 10°, mud or sand is effectively collected at the center portion of the crown block 22c. In the tire 2, since the crown block 22c can shear a lot of mud or sand, greater traction is generated. The tire 2 exhibits good traction performance on a soft road surface. From this viewpoint, this inclination angle is more preferably not less than 15°.

If the inclination angle of each edge component 58c included in the combination of edge components 58c having a difference in inclination angle therebetween whose absolute value is not greater than 10° is set to be not greater than 45°, the edge component 58c can exhibit a sufficient edge effect on a hard road surface. The tire 2 has excellent traction performance on a hard road surface. From this viewpoint, this inclination angle is more preferably not greater than 40° and further preferably not greater than 35°.

In the tire 2, in each middle front edge 46m, the inclination angle of each edge component 58m included in the combination of edge components 58m having a difference in inclination angle therebetween whose absolute value is not greater than 10° is preferably not less than 10° and preferably not greater than 45°.

If the inclination angle of each edge component 58m included in the combination of edge components 58m having a difference in inclination angle therebetween whose absolute value is not greater than 10° is set to be not less than 10°, the middle block 22m effectively contributes to guiding mud or sand to the center portion of the crown block 22c. In the tire 2, since the crown block 22c can shear a lot of mud or sand, greater traction is generated. The tire 2 exhibits good traction performance on a soft road surface. From this viewpoint, this inclination angle is more preferably not less than 15°.

If the inclination angle of each edge component 58m included in the combination of edge components 58m having a difference in inclination angle therebetween whose absolute value is not greater than 10° is set to be not greater than 45°, this edge component 58m can exhibit a sufficient edge effect on a hard road surface. The tire 2 has excellent traction performance on a hard road surface. From this viewpoint, this inclination angle is more preferably not greater than 40° and further preferably not greater than 35°.

In the tire 2, from the viewpoint that good traction performance is exhibited on a soft road surface and a hard road surface, more preferably, in each inclined edge 54c of each crown front edge 46c, the inclination angle of each edge component 58c included in the combination of edge components 58c having a difference in inclination angle therebetween whose absolute value is not greater than 10° is not less than 10° and not greater than 45°, and, in each middle front edge 46m, the inclination angle of each edge component 58m included in the combination of edge components 58m having a difference in inclination angle therebetween whose absolute value is not greater than 10° is not less than 10° and not greater than 45°.

In the tire 2, an edge component 58 having an inclination angle of not less than 10° and not greater than 45° is an edge component having a gentle inclination, and is also referred to as a gentle inclination component. On the other hand, an edge component 58 having an inclination angle of greater than 45° and not greater than 90° is an edge component having a steep inclination, and is also referred to as a steep inclination component. The length of each edge component 58 as a gentle inclination component is preferably not less than 3 mm and preferably not greater than 15 mm. Each edge component 58 as a steep inclination component is shorter than each edge component 58 as a gentle inclination component, and the length of each edge component 58 as a steep inclination component is preferably not less than 2 mm and preferably not greater than 10 mm.

In the tire 2, in the case where each inclined edge 54c of each crown front edge 46c includes at least one combination of edge components 58c having a difference in inclination angle therebetween whose absolute value is not greater than 10°, the at least three edge components 58c included in each inclined edge 54c of each crown front edge 46c preferably includes a steep inclination component. Accordingly, even when side slip occurs in the tire 2 during running on a hard road surface and the direction of the tire 2 relative to the travelling direction is changed, each inclined edge 54c of each crown front edge 46c can exhibit an edge effect required for generating traction. In the tire 2, sufficient traction is obtained even on a hard road surface, and the amount of slip in the lateral direction is effectively reduced.

In the tire 2, in the case where each middle front edge 46m includes at least one combination of edge components 58m having a difference in inclination angle therebetween whose absolute value is not greater than 10°, the at least three edge components 58m included in each middle front edge 46m preferably includes a steep inclination component. Accordingly, even when side slip occurs in the tire 2 during running on a hard road surface and the direction of the tire 2 relative to the travelling direction is changed, each middle front edge 46m can exhibit an edge effect required for generating traction. In the tire 2, sufficient traction is obtained even on a hard road surface, and the amount of slip in the lateral direction is effectively reduced.

In the tire 2, in each inclined edge 54c of each crown front edge 46c, the first edge component 58ca is preferably a gentle inclination component. Accordingly, mud or sand is effectively collected at the center portion of the crown block 22c. In the tire 2, since the crown block 22c can shear a lot of mud or sand, greater traction is generated. In this case, from the viewpoint of more effectively collecting mud or sand at the center portion of the crown block 22c, the second edge component 58cb is more preferably a steep inclination component.

In the tire 2, in each middle front edge 46m, the first edge component 58ma is preferably a gentle inclination component. Accordingly, each middle block 22m effectively contributes to guiding mud or sand to the center portion of the crown block 22c. In the tire 2, since the crown block 22c can shear a lot of mud or sand, greater traction is generated. In this case, from the viewpoint that each middle block 22m can effectively contribute to guiding mud or sand to the center portion of the crown block 22c, the second edge component 58mb is more preferably a steep inclination component.

As described above, according to the present invention, the motorcycle tire 2 that can achieve improvement of traction performance and side slip resistance on a hard road surface while maintaining traction performance on a soft road surface, is obtained.

EXAMPLES

The following will describe the present invention in further detail by means of examples, etc., but the present invention is not limited to these examples.

Example 1

A motorcycle tire (size=120/80-19) having the basic structure shown in FIG. 1 and having specifications shown in Table 1 below was obtained.

In Example 1, the block pattern shown in FIG. 2 was adopted. The ratio (Lc/Wc) of each crown block was 0.28. The ratio (Lmu/Wm) of each middle block was 0.54.

Each inclined edge of each crown front edge included a first edge component, a second edge component, and a third edge component. The number of combinations of edge components having a difference in inclination angle therebetween whose absolute value is not greater than 10°, the inclination angle θca of the first edge component, the inclination angle θcb of the second edge component, and the inclination angle θcc of the third edge component were set as shown in Table 1 below. In Table 1 and Table 2, an inclination angle θcd represents the inclination angle of a fourth edge component in the case where the inclined edge included four edge components.

Each middle front edge included a first edge component, a second edge component, and a third edge component. The number of combinations of edge components having a difference in inclination angle therebetween whose absolute value is not greater than 10°, the inclination angle θma of the first edge component, the inclination angle θmb of the second edge component, and the inclination angle θmc of the third edge component were set as shown in Table 1 below. In Table 1 and Table 2, an inclination angle θmd represents the inclination angle of a fourth edge component in the case where the middle front edge included four edge components.

Examples 2 to 7 and Comparative Examples 1 and 2

Tires of Examples 2 to 7 and Comparative Examples 1 and 2 were obtained in the same manner as Example 1, except that the block pattern was as shown in Table 1 and Table 2 below, and the configurations of each inclined edge of each crown front edge and each middle front edge were changed.

[Running Performance on Soft Road Surface]

A test tire was fitted onto a rim (2.15WM) and inflated with air to adjust the internal pressure thereof to 80 kPa. The tire was mounted to the rear wheel of a test vehicle (motorcycle for motocross racing with an engine displacement of 450 cc). A commercially available tire (80/100-21) fitted onto a rim (1.60WM) and having an internal pressure adjusted to 80 kPa was mounted to the front wheel. The test vehicle was caused to run on a test course including a soft road surface composed of muddy ground containing a large amount of water, and a test rider having professional skills made evaluations (sensory evaluations) for traction performance. The results are shown as indexes in Table 1 and Table 2 below. The higher the value is, the better the performance of the tire is.

[Running Performance on Hard Road Surface]

A test tire was fitted onto a rim (2.15WM) and inflated with air to adjust the internal pressure thereof to 80 kPa. The tire was mounted to the rear wheel of a test vehicle (motorcycle for motocross racing with an engine displacement of 450 cc). A commercially available tire (80/100-21) fitted onto a rim (1.60WM) and having an internal pressure adjusted to 80 kPa was mounted to the front wheel. The test vehicle was caused to run on a test course including a hard road surface composed of packed sand and rocks, and a test rider having professional skills made evaluations (sensory evaluations) for traction performance and side slip resistance. The results are shown as indexes in Table 1 and Table 2 below. The higher the value is, the better the performance of the tire is.

TABLE 1

Figure 5:
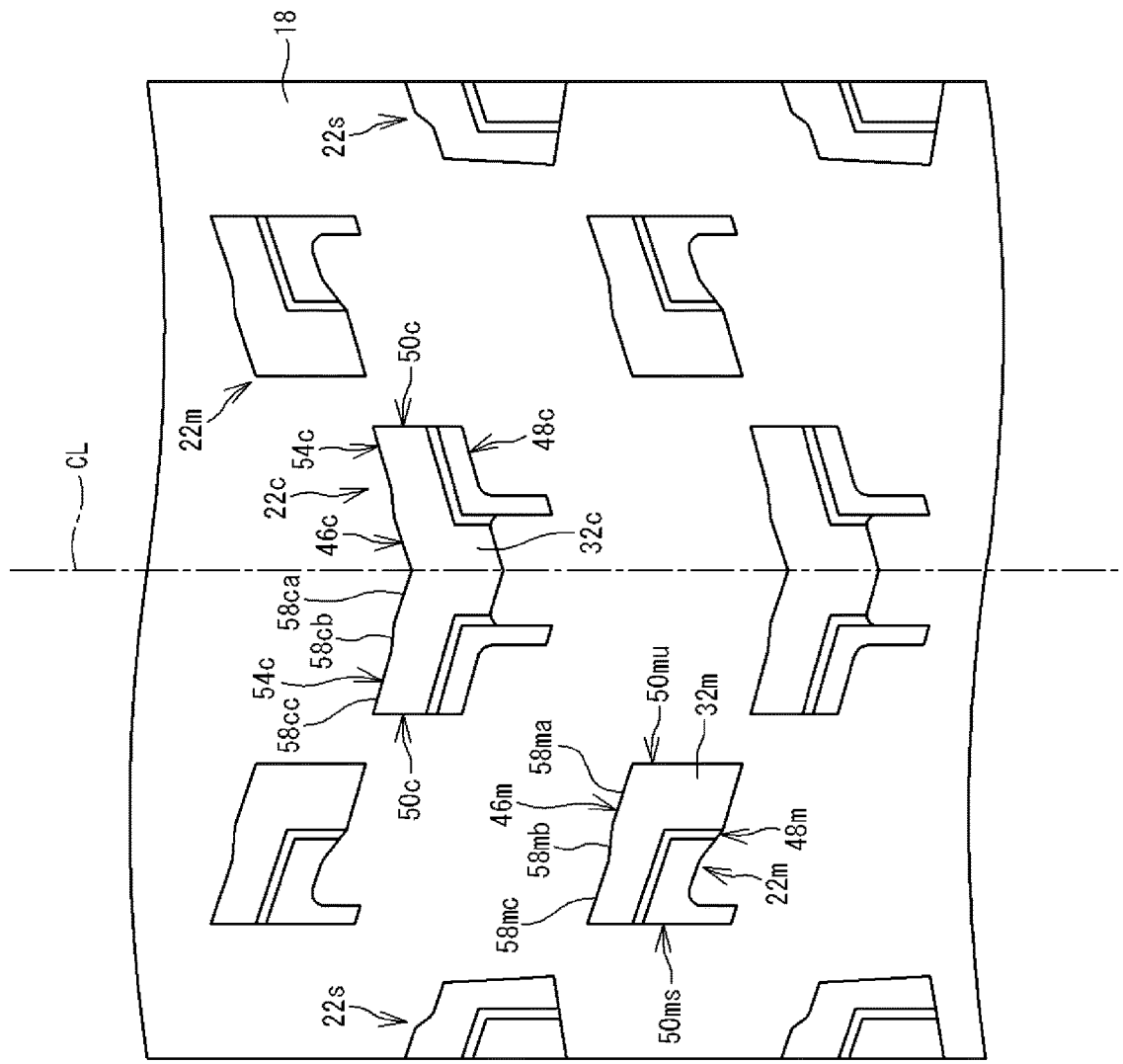
FIG. 5 is a development showing a part of a tread surface of Example 2.
Figure 6:
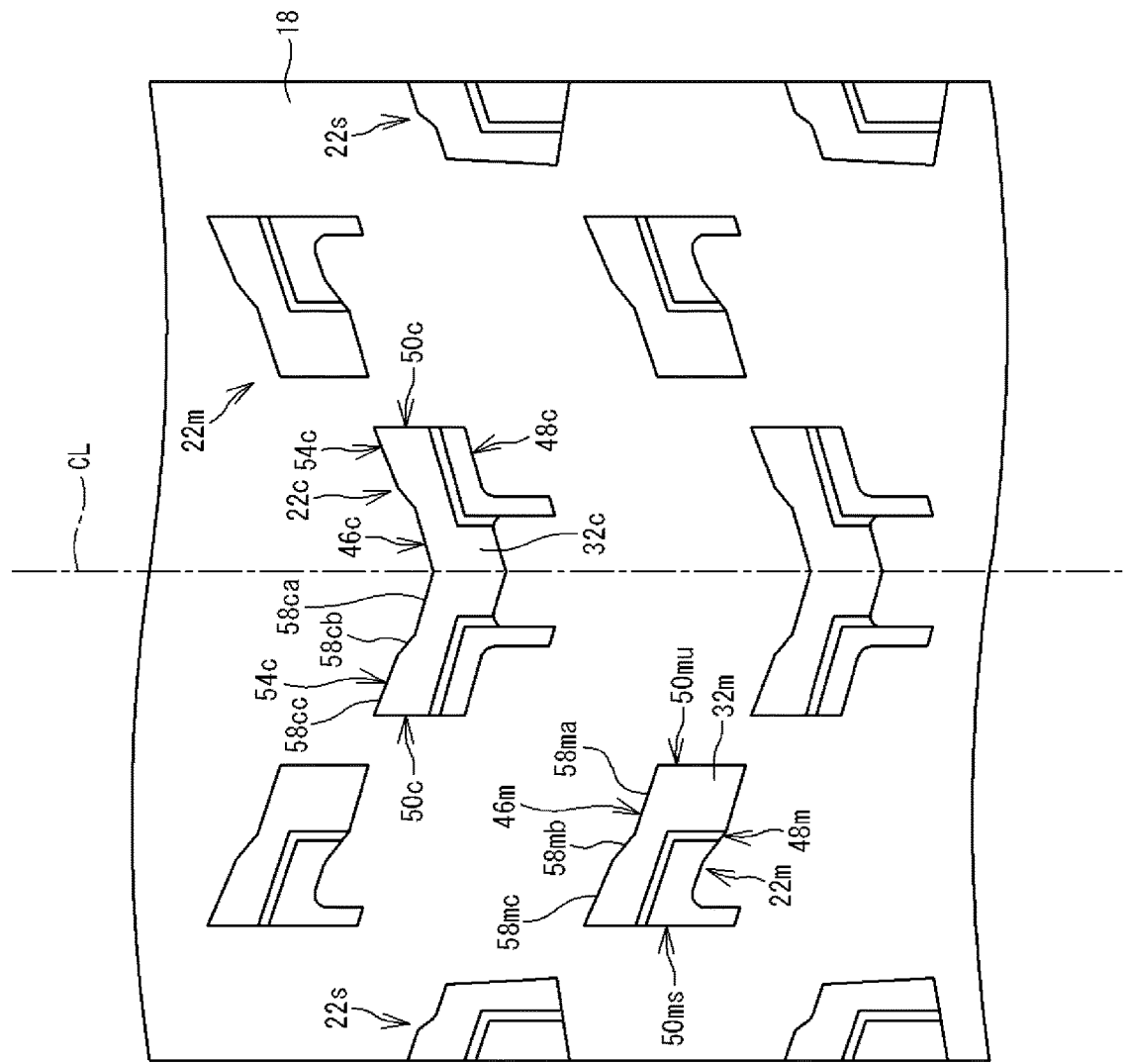
FIG. 6 is a development showing a part of a tread surface of Example 3.
Figure 11:
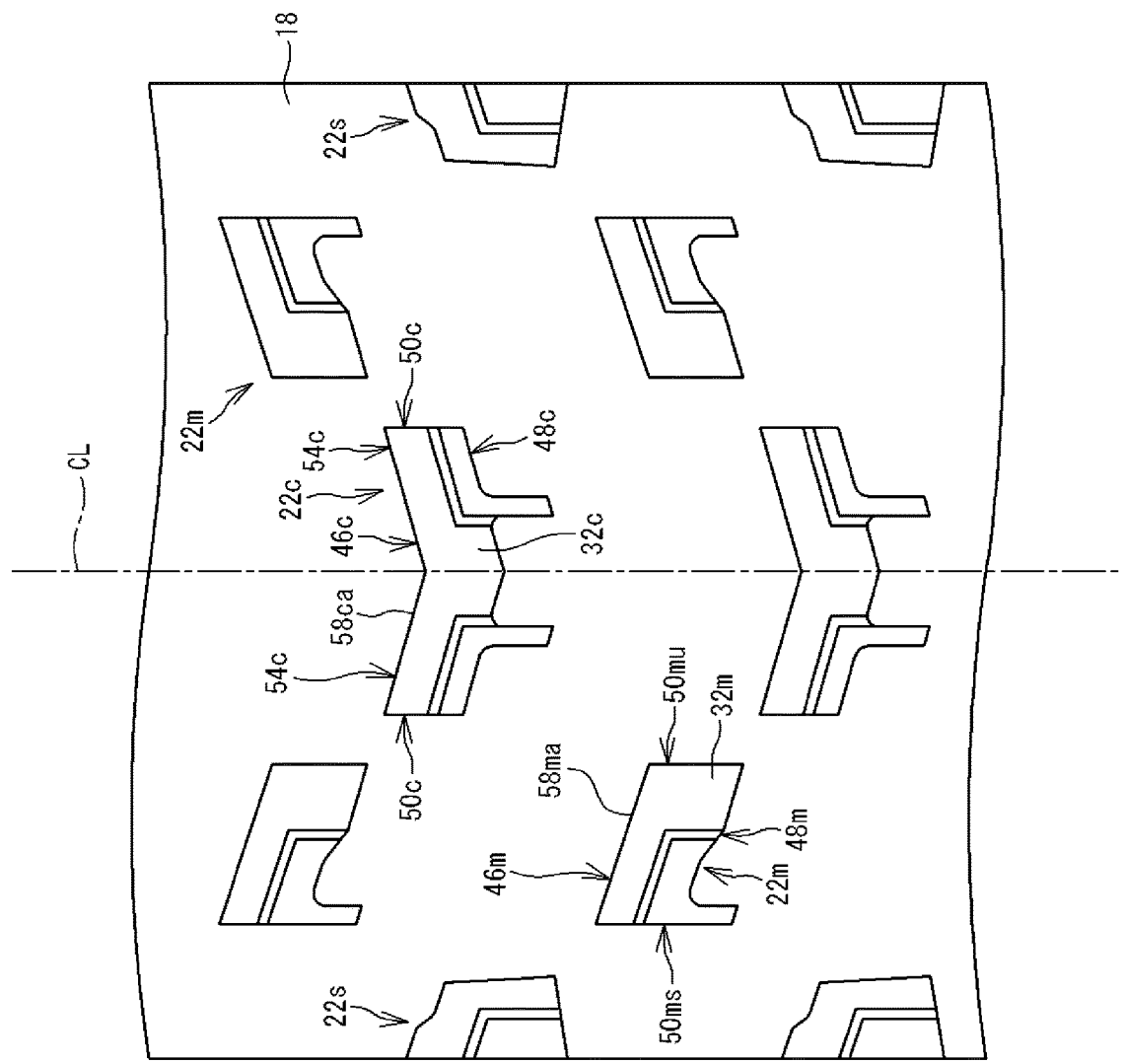
FIG. 11 is a development showing a part of a tread surface of Comparative Example 1.
Figure 12:
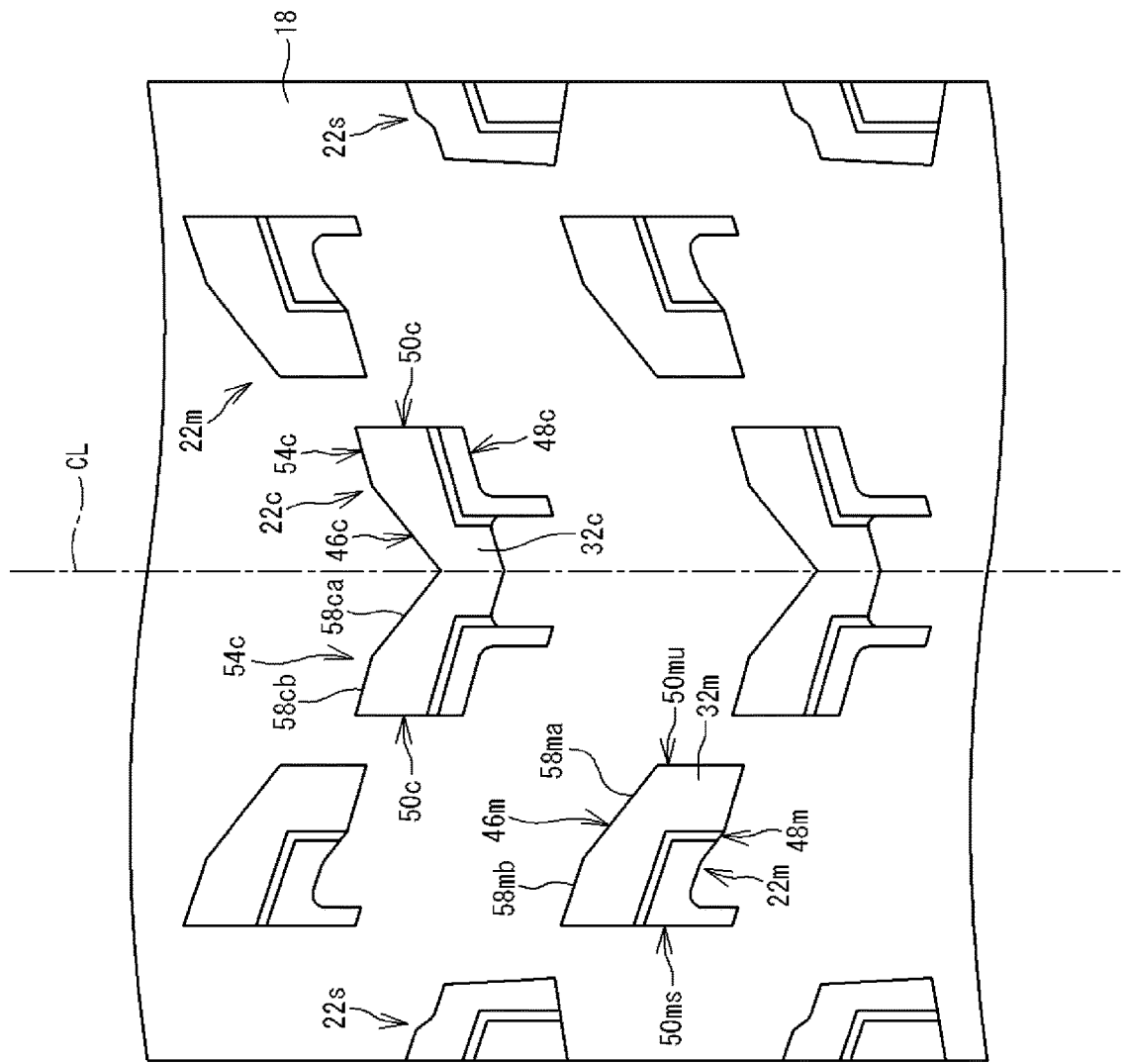
FIG. 12 is a development showing a part of a tread surface of Comparative Example 2.

| | | Comparative Example 1 FIG. 11 | Comparative Example 2 FIG. 12 | Example 2 FIG. 5 | Example 1 FIG. 2 | Example 3 FIG. 6 |
|---|---|---|---|---|---|---|
| Block pattern | | | | | | |
| Crown block | Lc/Wc [−] | 0.26 | 0.37 | 0.28 | 0.28 | 0.30 |
| | Number of edge components | 1 | 2 | 3 | 3 | 3 |
| | Number of combinations | — | 0 | 1 | 1 | 1 |
| | θca [°] | 20 | 40 | 20 | 20 | 20 |
| | θcb [°] | — | 20 | 5 | 50 | 50 |
| | θcc [°] | — | — | 20 | 20 | 25 |
| | θcd [°] | — | — | — | — | — |
| Middle block | Lmu/Wm [−] | 0.54 | 0.54 | 0.65 | 0.54 | 0.54 |
| | Number of edge components | 1 | 1 | 2 | 3 | 3 | 3 |
| | Number of combinations | — | 0 | 1 | 1 | 1 |
| | θma [°] | 20 | 40 | 20 | 20 | 20 |
| | θmb [°] | — | 20 | 5 | 50 | 50 |
| | θmc [°] | — | — | 20 | 20 | 25 |
| | θmd [°] | — | — | — | — | — |
| Soft road surface | Traction performance | 100 | 95 | 100 | 105 | 105 |
| Hard road surface | Traction performance | 100 | 105 | 105 | 113 | 113 |
| | Side slip resistance | 100 | 110 | 117 | 125 | 125 |

TABLE 2

Figure 7:
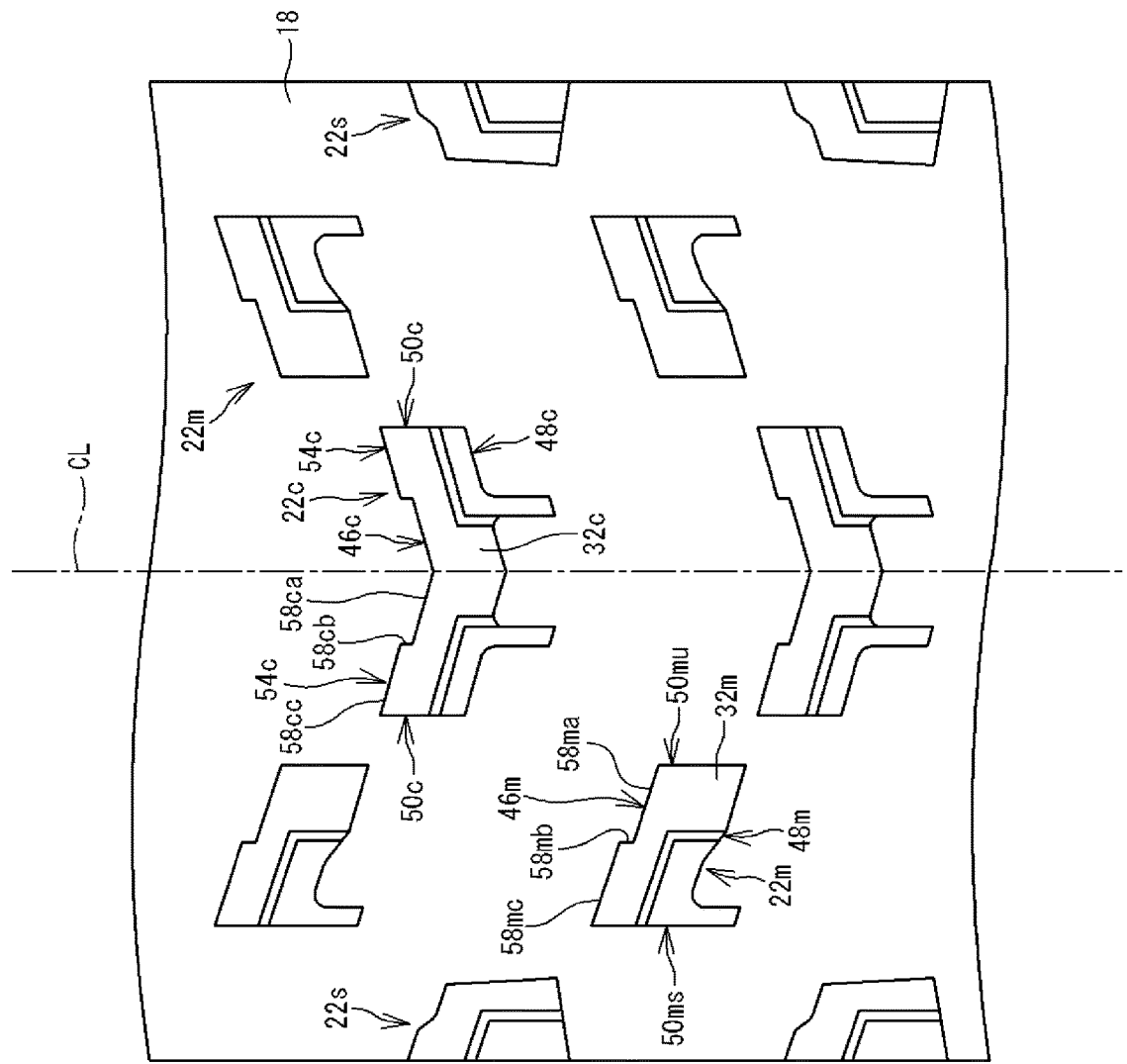
FIG. 7 is a development showing a part of a tread surface of Example 4.
Figure 8:
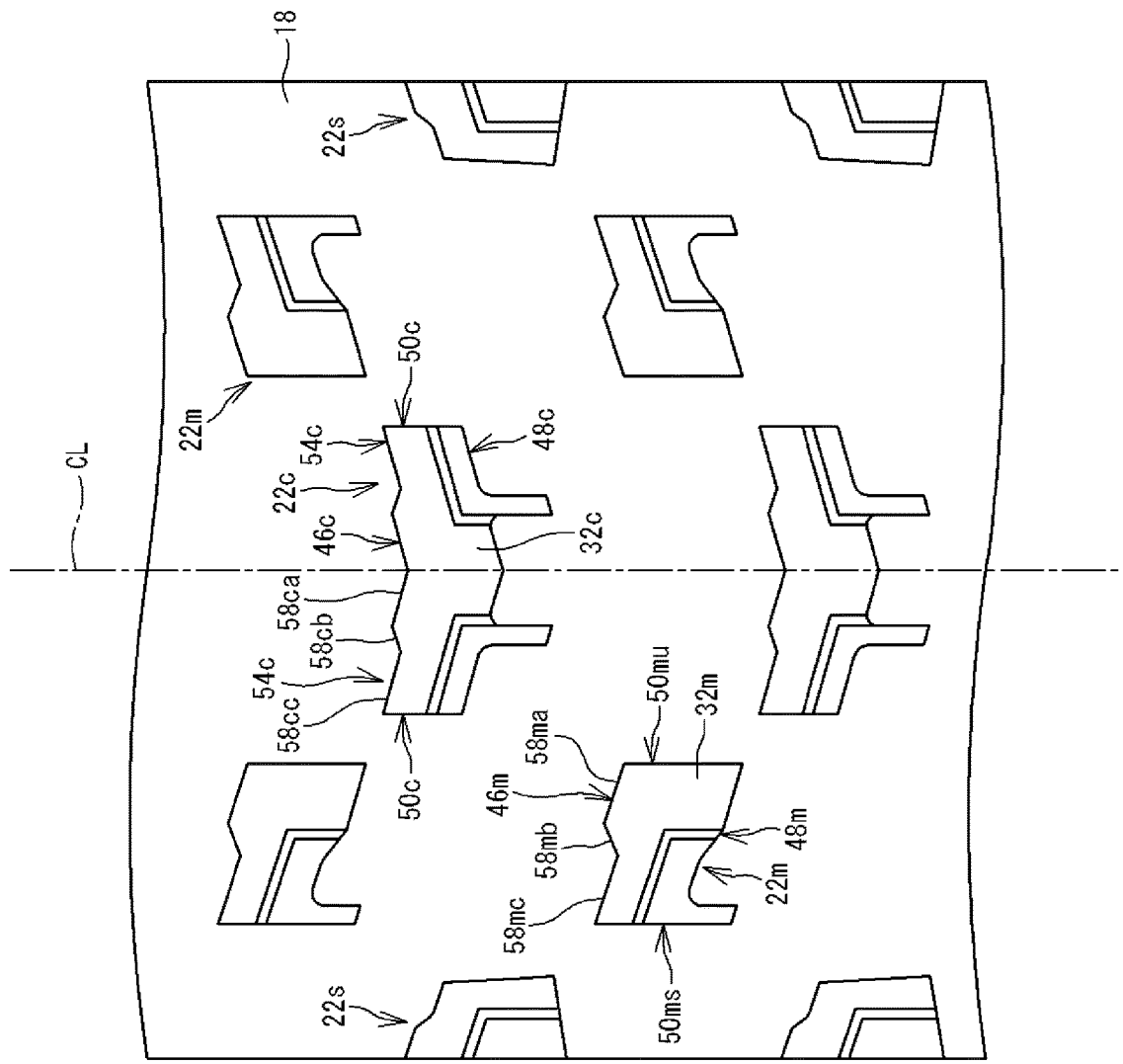
FIG. 8 is a development showing a part of a tread surface of Example 5.
Figure 9:
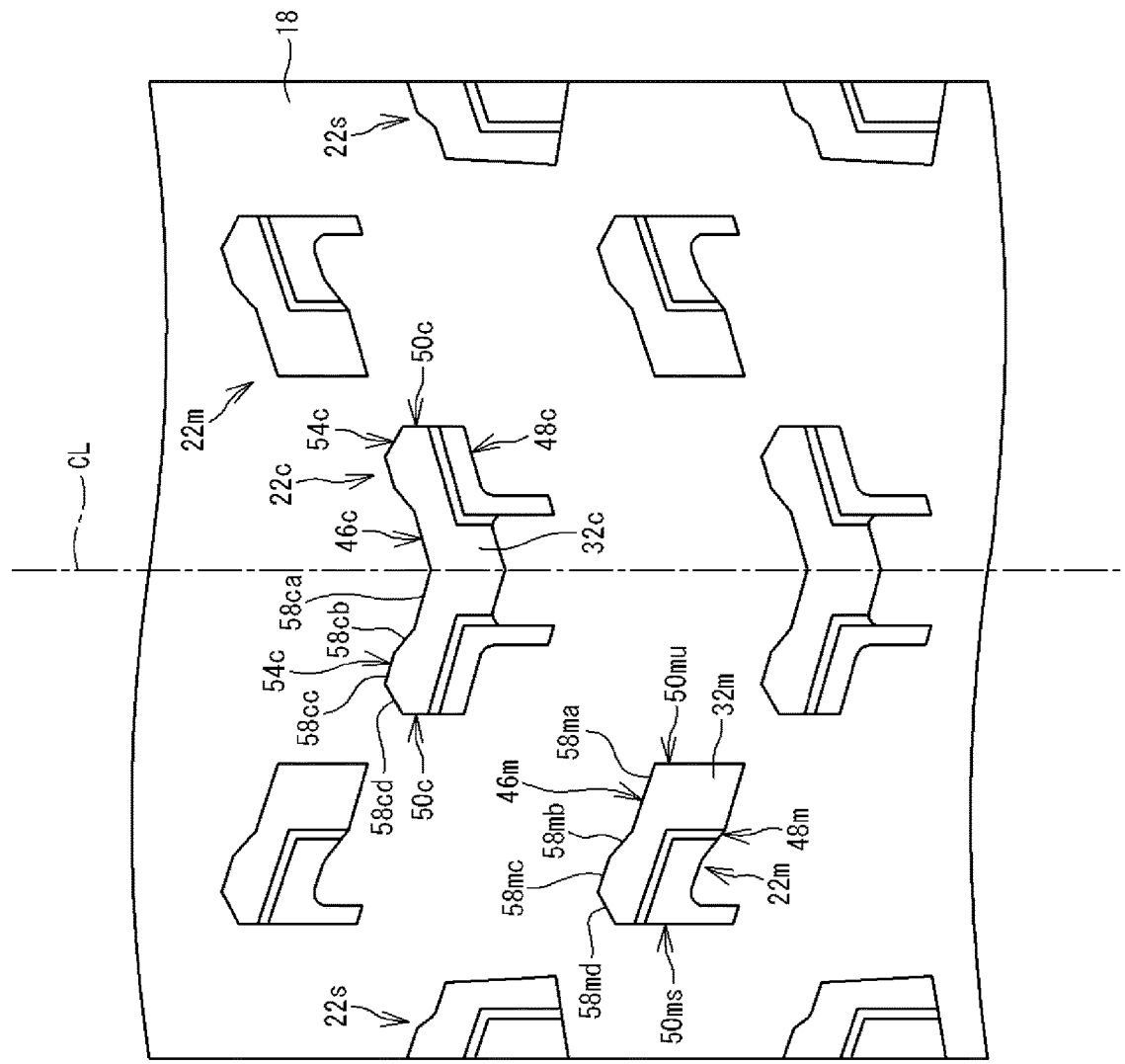
FIG. 9 is a development showing a part of a tread surface of Example 6.
Figure 10:
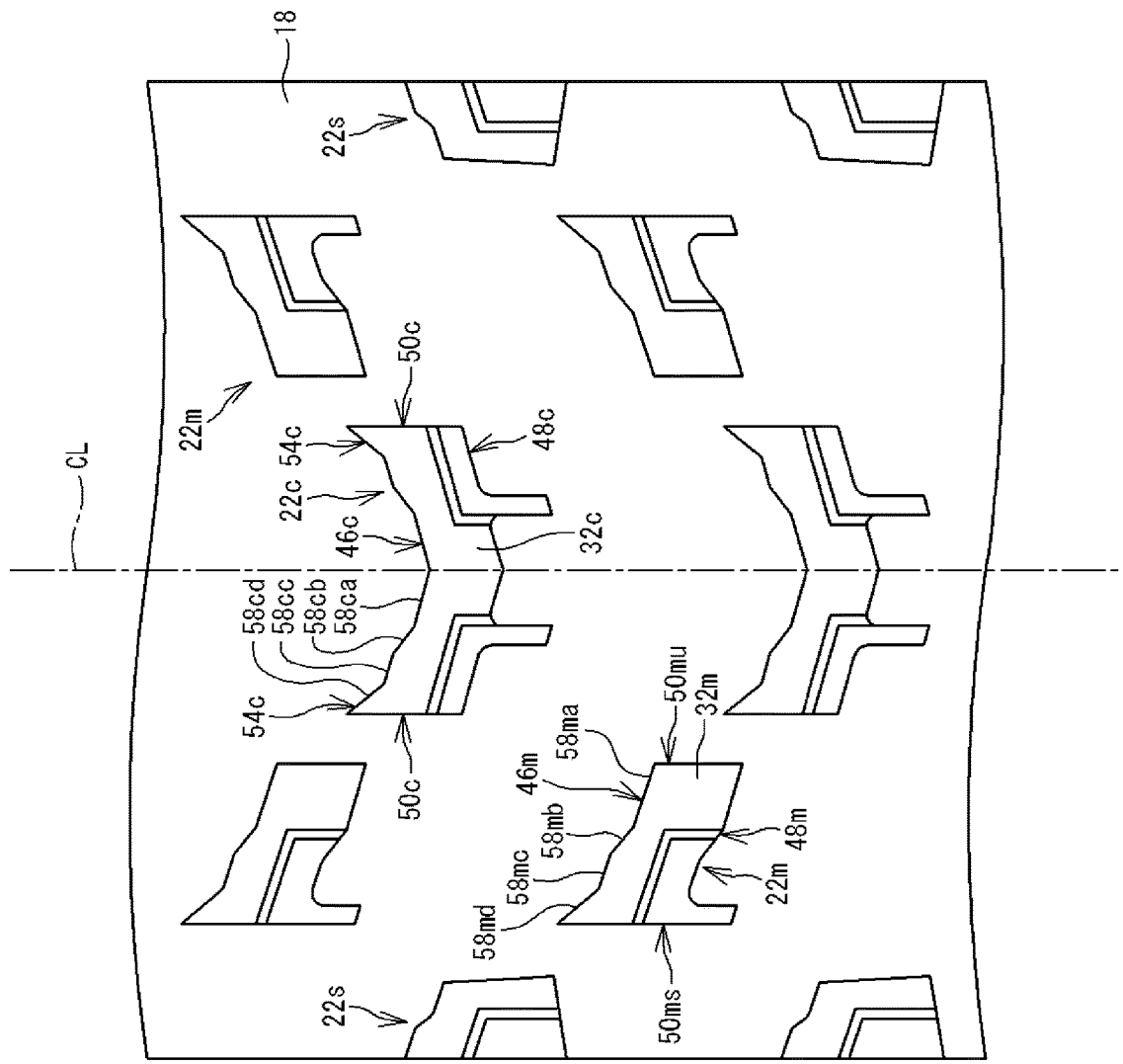
FIG. 10 is a development showing a part of a tread surface of Example 7.

| | | Example 4 FIG. 7 | Example 5 FIG. 8 | Example 6 FIG. 9 | Example 7 FIG. 10 |
|---|---|---|---|---|---|
| Block pattern | | | | | |
| Crown block | Lc/Wc [−] | 0.28 | 0.26 | 0.22 | 0.37 |
| | Number of edge components | 3 | 3 | 4 | 4 |
| | Number of combinations | 1 | 1 | 3 | 1 |
| | θca [°] | 20 | 20 | 20 | 20 |
| | θcb [°] | 90 | 160 | 15 | 50 |
| | θcc [°] | 20 | 20 | 20 | 20 |
| | θcd [°] | — | — | 155 | 60 |
| Middle block | Lmu/Wm [−] | 0.54 | 0.69 | 0.54 | 0.54 |
| | Number of edge components | 3 | 3 | 4 | 4 |
| | Number of combinations | 1 | 1 | 3 | 1 |

TABLE 2-continued

|  |  | Example 4 | Example 5 | Example 6 | Example 7 |
|---|---|---|---|---|---|
|  | combinations |  |  |  |  |
|  | θma [°] | 20 | 20 | 20 | 20 |
|  | θmb [°] | 90 | 160 | 15 | 50 |
|  | θmc [°] | 20 | 20 | 20 | 20 |
|  | θmd [°] | — | — | 155 | 60 |
| Soft road surface | Traction performance | 100 | 100 | 95 | 103 |
| Hard road surface | Traction performance | 113 | 108 | 108 | 108 |
|  | Side slip resistance | 135 | 110 | 110 | 130 |

As shown in Table 1 and Table 2, in the Examples, improvement of traction performance and side slip resistance on a hard road surface is achieved while traction performance on a soft road surface is maintained. From the evaluation results, advantages of the present invention are clear.

INDUSTRIAL APPLICABILITY

The above-described technology to achieve improvement of traction performance and side slip resistance on a hard road surface while maintaining traction performance on a soft road surface can also be applied to various tires.

REFERENCE SIGNS LIST 2 tire
4 tread
18 tread surface
22c, 22m, 22s block
32, 32c, 32m top surface
36 land surface
38 sea surface
46c, 46m front edge
50c, 50mu side edge
54c inclined edge
58, 58c, 58ca, 58cb, 58cc, 58cd, 58m, 58ma, 58mb, 58mc, 58md edge component

The invention claimed is:

1. A motorcycle tire comprising a tread having a tread surface that forms an outer circumferential surface and having a designated rotation direction, wherein
the tread includes a plurality of blocks,
each of the plurality of blocks includes a top surface that forms a part of the tread surface,
the plurality of blocks includes a plurality of crown blocks located on an equator plane and a plurality of middle blocks located outward of the plurality of crown blocks in an axial direction,
a region between two division lines dividing the development width of the tread surface into three equal parts is a crown region,
the plurality of blocks provided in the crown region are all crown blocks,
each crown block and each middle block have a laterally extending shape that is longer in the axial direction and shorter in the rotation direction,
the top surface of each crown block includes a crown front edge located on a toe side in the rotation direction,
the crown front edge has a bottom located on a heel side with respect to both ends thereof in the rotation direction,
the crown front edge has a portion connecting the bottom and each of the ends, the portion forming an inclined edge extending from the bottom to one of the ends and inclined to the toe side in the rotation direction,
an entirety of the crown front edge includes a pair of inclined edges including the inclined edge,
the top surface of the middle block includes a middle front edge located on the toe side in the rotation direction,
an inner end of the middle front edge is located on the heel side with respect to an outer end thereof in the rotation direction,
the middle front edge extends from the inner end toward the outer end and is inclined to the toe side in the rotation direction,
the inclined edge of the crown front edge and the middle front edge each include at least three edge components,
all blocks, among the plurality of blocks, that are located on the equator plane and arranged at intervals in the rotation direction, are the plurality of crown blocks, and
an entirety of each middle block included in the plurality of blocks is located axially outward of a corresponding crown block of the crown blocks.

2. The motorcycle tire according to claim 1, wherein the at least three edge components include at least one combination of edge components having a difference in inclination angle therebetween whose absolute value is not greater than 10°.

3. The motorcycle tire according to claim 2, wherein an inclination angle of each edge component included in the combination of the edge components is not less than 10° and not greater than 45°.

4. The motorcycle tire according to claim 2, wherein the at least three edge components include a steep inclination component having an inclination angle of greater than 45° and not greater than 90°.

5. The motorcycle tire according to claim 1, wherein
the top surface of each block includes a land surface, and
a land/sea ratio represented as a ratio of a total area of the land surfaces to a total area of a portion other than the land surfaces in the tread surface is not less than 13% and not greater than 60%.

6. The motorcycle tire according to claim 1, wherein as for adjacent edge components of the at least three edge components, one edge component and another edge component differ from each other inclination angle.

7. The motorcycle tire according to claim 3, wherein an edge component having the inclination angle of not less than 10° and not greater than 45° is a gentle inclination component,
the at least three edge components include a first edge component, a second edge component, and a third edge component from an equator plane side toward an outer side in the axial direction, and
the first edge component is the gentle inclination component.

8. The motorcycle tire according to claim 7, wherein the second edge component is a steep inclination component having an inclination angle of greater than 45° and not greater than 90°.

9. The motorcycle tire according to claim 1, wherein the edge components included in each inclined edge of each crown front edge is equal in number to the edge components included in each middle front edge.

10. The motorcycle tire according to claim 1, wherein the plurality of middle blocks are arranged at intervals in the rotation direction,
each of the plurality of middle blocks is located between corresponding two crown blocks of the plurality of crown blocks arranged in the rotation direction.

11. The motorcycle tire according to claim 1, wherein the plurality of middle blocks are arranged at intervals in the rotation direction,
an entirety of each of the plurality of middle blocks is located between corresponding two crown blocks of the plurality of crown blocks arranged in the rotation direction.

12. The motorcycle tire according to claim 1, wherein the crown block includes a block main body, and a pair of projections located with the equator plane therebetween, the pair of projections extending from the block main body to the heel side in a circumferential direction.

13. The motorcycle tire according to claim 1, wherein the plurality of crown blocks and the plurality of middle blocks are alternately arranged in the circumferential direction.

14. A motorcycle tire comprising a tread having a tread surface that forms an outer circumferential surface and having a designated rotation direction, wherein
the tread includes a plurality of blocks,
each of the plurality of blocks includes a top surface that forms a part of the tread surface,
the plurality of blocks includes a plurality of crown blocks located on an equator plane and a plurality of middle blocks located outward of the plurality of crown blocks in an axial direction,
a region between two division lines dividing the development width of the tread surface into three equal parts is a crown region,
the plurality of blocks provided in the crown region are all crown blocks,
the plurality of crown blocks and the plurality of middle blocks are alternately arranged in the circumferential direction,
each crown block and each middle block have a laterally extending shape that is longer in the axial direction and shorter in the rotation direction,
the top surface of each crown block includes a crown front edge located on a toe side in the rotation direction,
the crown front edge has a bottom located on a heel side with respect to both ends thereof in the rotation direction,
the crown front edge has a portion connecting the bottom and each of the ends, the portion forming an inclined edge extending from the bottom to one of the ends and inclined to the toe side in the rotation direction,
an entirety of the crown front edge includes a pair of inclined edges including the inclined edge,
the top surface of the middle block includes a middle front edge located on the toe side in the rotation direction,
an inner end of the middle front edge is located on the heel side with respect to an outer end thereof in the rotation direction,
the middle front edge extends from the inner end toward the outer end and is inclined to the toe side in the rotation direction,
the inclined edge of the crown front edge and the middle front edge each include at least three edge components,
all blocks, among the plurality of blocks, that are located on the equator plane and arranged at intervals in the rotation direction, are the plurality of crown blocks, and
an entirety of each middle block included in the plurality of blocks is located axially outward of a corresponding crown block of the crown blocks.

* * * * *